Patented Apr. 8, 1952

2,591,742

UNITED STATES PATENT OFFICE 2,591,742

ENTERIC MEDICAMENT

Charles C. H. Thomas, Ben Avon, and Leonard E. Edelman, Pittsburgh, Pa.; said Edelman assignor to said Thomas No Drawing. Application November 22, 1949, Serial No. 128,914

6 Claims. (Cl. 167—70)

This invention is for products of medicinal or physiological use with an enteric protection whereby such product will normally pass through the stomach of an animal or crop of a fowl without release or dissipation of its active agent, but will be released in the digestive tract beyond such organs, as for example the intestine of humans or animals, or the gizzard or intestines of fowls. The invention also permits a certain selectivity as to the point where release of the ingredients begins and ends.

It has of course been proposed heretofore to use so-called enteric coatings in connection with various medicines and biological preparations, but for various reasons their performance is not as satisfactory as might be hoped for.

In the administration of colloidal iodine for medication of the intestines of humans or animals, or the treatment of the gizzard or intestines of fowls, great difficulty is encountered in providing effective introduction of the iodine in useful amounts and uncombined form to these organs. Among some of the difficulties are the extremely active nature of the colloidal iodine, the difficulty of providing an enteric protection non-reactive to the iodine and resistant to stomach fluids, but nevertheless capable of disrupting in the posterior digestive tract. Consequently, although colloidal iodine is recognized as being very effective for the treatment of intestinal disorders caused by bacteria, protozoa and parasites, as for example coccidiosis, round worms and tape worms in poultry and animals, it could not be used effectively because the stomach fluids render it ineffective, and tubes have been devised to enable it to be introduced into the intestine, or, in the case of poultry, the gizzard. The use of such tubes involves a difficult and time-consuming and uneconomical technique.

The present invention has for its object to provide an enteric protection for products such as medicines, biologicals such as hormones, penicillin, and other substances, and especially colloidal iodine, and an improved method of making the same.

The invention has for a further object to provide enterically protected iodine and a new method of preparing same.

A further object of the invention is to provide colloidal iodine in which colloidal particles are enterically protected.

These and other objects and advantages are derived from our invention as hereinafter more fully described.

According to our invention, sodium carboxymethylcellulose is used as the protective agent. This substance has the chemical formula

wherein R represents cellulose residue. Chemically it is the reaction product of a strong base and a weak acid. It is readily soluble in water but at pH values in the range of 0.4 to 2.5 sodium carboxymethylcellulose will react with an acid according to the reaction

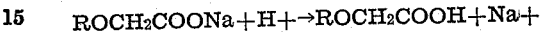

The reaction product which is precipitated is cellulosic acid which is insoluble in water. This precipitate will redissolve in an alkali. The pH of the normal human stomach is about 0.88 and therefore this precipitate will form about and provide a protecting envelop over the surface of the sodium carboxymethylcellulose when such a pill utilizing it is taken. The film so formed by the gastric acids will then disperse as the pill moves posteriorally into the intestinal tract where the pH is higher and a less acid or more alkaline environment is encountered. A similar condition prevails in animals, with the exception of the ruminants.

In the case of chickens, however, a special problem exists, as can be seen from a consideration of the following pH values of the alimentary tract of a chicken:

| Organ: | pH |
|---|---|
| Crop | 5 |
| Proventriculus | 5 or slightly less |
| Gizzard | 4.06 |
| Intestine: | |
|     Duodenum | 6.31 |
|     Jejenum | 7.04 |
|     Ileum | 7.59 |
|     Right cecum | 7.08 |
|     Left cecum | 7.12 |
|     Rectum | 7.38 |
|     Coprodeum | 7.24 |

Here the pH range of the organs is all too high to provide the acid environment to convert the sodium carboxymethylcellulose to cellulosic acid. While this may be corrected by a proper accompanying diet, we prefer to pre-treat the protected product with an acid to deposit the insoluble film on the product. As a matter of fact such acid treatment is preferred for products for human or animal consumption also whereby proper action will be assured even if the patient's stomach should not provide a sufficiently acid environment.

We prefer to dip the protected product therefor into hydrochloric acid which has a pH value of 1 to precipitate upon the product the water-insoluble cellulosic acid. It is not only the most effective for the purpose, but is also the most volatile so that the product can be dried after immersion in the acid and the attendant precipitation of the film of cellulosic acid on its surface without the precaution of any neutralizing procedure, as might be required with sulphuric, phosphoric or other acid.

As an alternative to precipitating cellulosic acid over the pill, the pills or other bodies formed with sodium carboxymethylcellulose may be provided with a thin protecting coating of some other water-insoluble material, as cellulose acetate or cellulose nitrate, or the like, which will protect the sodium carboxymethylcellulose until the mechanical action of the gizzard ruptures the film and exposes the water-soluble sodium carboxymethylcellulose.

Sodium carboxymethylcellulose is not appreciably affected by colloidal iodine, and we have found that it provides an especially useful enteric vehicle or protecting medium for colloidal iodine. While it may be applied as a coating over a tablet of colloidal iodine, as with other substances, we find that it may be mixed with colloidal iodine so as to provide a bonded mass in which individual particles of iodine are enveloped in the enteric vehicle. Powdered sodium carboxymethylcellulose may, for example, be introduced into an aqueous suspension of colloidal iodine to form a thick, formable composition that may be shaped into pills or pellets or extruded, or rolled into thin flakes which may be broken up into smaller pieces or flakes, or the dried mixture may be broken down to nearly powder fineness or into particles suitable for introduction into poultry or other feed.

In order to render such a mixture less sticky and more readily formable, filler agents may be employed, such as bentonite, magnesium aluminum silicate, kaolin, china clay, or the like. These materials in dry, finely-divided form are preferably mixed with the powdered sodium carboxymethylcellulose.

Alternatively, a solution of sodium carboxymethylcellulose and water, with or without the inert earthy material may be prepared, after which the colloidal iodine is introduced into it, whereupon the sodium carboxymethylcellulose functions as a protective colloid that envelops the colloidal iodine.

Examples of suitable compositions are as follows:

Example I

| | Gms. |
|---|---|
| Colloidal iodine (20% aqueous suspensoid) | 40 |
| Sodium carboxymethylcellulose (low viscosity—powdered) | 17 |

Example II

| | Gms. |
|---|---|
| Colloidal iodine (20% aqueous suspensoid) | 40 |
| Sodium carboxymethylcellulose (low viscosity—powdered) | 10 |
| Bentonite (U. S. P.) | 5 |

Mixtures formed according to the above examples are then shaped to form and dried; or a dried mass of the mix may be crushed and used in this crushed form or re-formed again into tablets. The composition may be altered widely, depending upon the strength of the iodine suspensoid and the concentration of iodine in the finished product. Intermediate and high voscosity sodium carboxymethylcellulose may also be used with good success.

After being formed into the ultimate product, we may, and in most cases do, immerse the product in aqueous hydrochloric acid sufficient to precipitate over the product a thin film of cellulosic acid, as hereinbefore explained, after which the product is dried and any residuum of unreacted acid is thereby removed.

Instead of introducing the sodium carboxymethylcellulose into an aqueous suspension of colloidal iodine, the reverse procedure may be followed, i. e., colloidal iodine may be introduced into water to which the sodium carboxymethylcellulose has been added, whereupon the sodium carboxymethylcellulose functions as a protective colloid about the iodine. Preferably iodine vapor is introduced directly into the water solution of sodium carboxymethylcellulose and colloidal particles of iodine are formed with the sodium carboxymethylcellulose forming a protective colloid, after which, if desired, increased amounts of the sodium carboxymethylcellulose may be added.

The present invention, by providing a soluble enteric protection which carries a water-insoluble film, or on which such a film is formed in an environment having a low pH number, such as that encountered in the stomach, but which film will disrupt and permit dissolution of the water-soluble protection in the posterior digestive tract, constitutes an improved medium for the oral administration of drugs, compounds or biologicals which are most desirably or efficaciously released in the intestines. Being neutral to iodine, sodium carboxymethylcellulose is especially useful as an enteric vehicle for this substance. Extensive studies in vitro and vivo support our assertions of the effective nature of our improvement.

We claim:

1. A finely-divided solid substance for internal medication enveloped in a coating of sodium carboxymethylcellulose, the sodium carboxymethylcellulose having a surface film of cellulosic acid thereover.

2. A substance for internal medication comprising colloidal particles of iodine enveloped in sodium carboxymethylcellulose which in turn has a surface film of cellulosic acid thereover.

3. A substance for internal medication comprising a formed mass of colloidal iodine and sodium carboxymethylcellulose and also carrying an inert earthy filler to which the iodine is non-reactive, there being an exterior film of cellulosic acid integrally formed with the sodium carboxymethylcellulose on the exposed surface of the product.

4. A substance for internal medication comprising a formed mass of colloidal iodine and sodium carboxymethylcellulose, the exterior of the body having a film of cellulosic acid precipitated thereon.

5. The method of preparing iodine for internal use which comprises bringing together colloidal iodine, sodium carboxymethylcellulose and water to form a thick mass, then forming and drying the said mass, immersing the formed material in hydrochloric acid and again drying it and evaporating any unreacted hydrochloric acid therefrom.

6. A new product for oral administration comprising a medicinal material diffused through a mass of sodium carboxymethylcellulose, the mass of sodium carboxymethylcellulose having a precipitated film of cellulosic acid over the surface thereof.

CHARLES C. H. THOMAS.
LEONARD E. EDELMAN.

REFERENCES CITED

The following references are of record in the file of this patent:

UNITED STATES PATENTS

| Number | Name | Date |
|---|---|---|
| 1,925,135 | Chandler | Sept. 5, 1933 |
| 2,196,768 | Hiatt | Apr. 9, 1940 |
| 2,333,283 | Wilson | Nov. 2, 1943 |
| 2,477,080 | Necheles | July 20, 1949 |
| 2,491,475 | Bogin | Dec. 20, 1949 |

OTHER REFERENCES

Hollabaugh: Industrial & Eng. Chem., October 1945, pp. 943–947.

Conant: Abst. of application Ser. No. 612,541, published September 27, 1949, Class 167—17, 626 O. G. 1158.